United States Patent
Young et al.

(10) Patent No.: US 12,488,394 B2
(45) Date of Patent: Dec. 2, 2025

(54) SYSTEM AND METHOD FOR DECREASING TURNAROUND FOR PRE-AUTHORIZATIONS USING A SMART REQUEST FOR INFORMATION MODEL

(71) Applicant: Elevance Health, Inc., Indianapolis, IN (US)

(72) Inventors: Jennifer M. Young, Cincinnati, OH (US); Sharon M. Goist, Alamogordo, NM (US); Jordan S. Firfer, Buffalo Grove, IL (US); Jayant Chaudhuri, Suwanee, GA (US); Rakeshkumar Patel, Glastonbury, CT (US); Soham Chakravarti, Suwanee, GA (US)

(73) Assignee: Elevance Health, Inc., Indianapolis, IN (US)

( * ) Notice: Subject to any disclaimer, the term of this patent is extended or adjusted under 35 U.S.C. 154(b) by 176 days.

(21) Appl. No.: 17/817,174

(22) Filed: Aug. 3, 2022

(65) Prior Publication Data
US 2023/0042449 A1    Feb. 9, 2023

Related U.S. Application Data

(60) Provisional application No. 63/228,917, filed on Aug. 3, 2021.

(51) Int. Cl.
*G06Q 40/08*    (2012.01)
*G16H 40/20*    (2018.01)

(52) U.S. Cl.
CPC ............. *G06Q 40/08* (2013.01); *G16H 40/20* (2018.01)

(58) Field of Classification Search
CPC .............................. G06Q 40/08; G16H 40/20
See application file for complete search history.

(56) References Cited

U.S. PATENT DOCUMENTS

| 11,862,305 | B1 * | 1/2024 | Sethi | G06N 3/02 |
|---|---|---|---|---|
| 2015/0379241 | A1 * | 12/2015 | Furst | G16H 10/60 |
|  |  |  |  | 705/3 |
| 2020/0075166 | A1 * | 3/2020 | Gleason | G16H 10/60 |
| 2024/0371499 | A1 * | 11/2024 | Kalafut | G16H 50/20 |

* cited by examiner

*Primary Examiner* — Sheetal R Paulson
(74) *Attorney, Agent, or Firm* — Morgan, Lewis & Bockius LLP (57) ABSTRACT

A method for reducing pre-authorization turnaround time is disclosed. The method includes, at a database, receiving historical data including a historical pre-authorization request and clinical information associated with a historical pre-authorization request. The method further includes receiving real-time data using an API gateway including real-time pre-authorization requests wherein the real-time data includes the real-time pre-authorization procedure and a clinical document category. The method further includes removing irrelevant data from real-time data and historical data to produce clean historical data and clean real-time data. The method further includes extracting data features required to train a machine learning model from the clean historical data and clean real-time data. The method further includes training the machine learning model by applying the extracted data features from the clean historical data and clean real-time data. The method further includes identifying prediction data results by applying the trained machine learning model.

3 Claims, 8 Drawing Sheets

| Clinical Text |
|---|
| MD orders |
| Reports from X-ray, MRIs or CT scan, PET Scan, and other laboratory/imaging studies obtained relevant to the requested service as described above |
| MD office notes and exam findings relative to this request |
| Previously tried treatments and medications |

FIG. 6A

| Clinical Text | Clinical Category |
|---|---|
| MD orders | Documentation |
| Reports from X-ray, MRIs or CT Scan, PET Scan, and other laboratory/imaging studies obtained relevant to the requested service as described above | Diagnostic Studies |
| MD office notes and exam findings relative to this request | Documentation |
| Previously tried treatments and medications | Psychiatric/Substance Abuse, Transplants, Documentation |

FIG. 6B

| Clinical Text | Label 1 | Label 2 | Label n |
|---|---|---|---|
| MD orders | Documentation | | |
| Reports from X-ray, MRIs or CT Scan, PET Scan, and other laboratory/imaging studies obtained relevant to the requested service as described above | Diagnostic Studies | | |
| MD office notes and exam findings relative to this request | Documentation | | |
| Previously tried treatments and medications | Psychiatric/Substance Abuse | Transplants | Documentation |

FIG. 6C

| Procedure Code | Clinical Text |
|---|---|
| 1100865 | • MD orders<br>• Reports from X-ray, MRIs or CT Scan, PET Scan, and other laboratory/imaging studies obtained relevant to the requested service as described above<br>• MD office notes and exam findings relative to this request |
| 1100866 | • MD orders<br>• Reports from X-ray, MRIs or CT Scan, PET Scan, and other laboratory/imaging studies obtained relevant to the requested service as described above<br>• MD office notes and exam findings relative to this request |

FIG. 6D

| Procedure Code | Category |
|---|---|
| 1100865 | • Documentation<br>• Diagnostic Studies |
| 1100866 | • Documentation<br>• Diagnostic Studies |

FIG. 6E

| Procedure Code | Label 1 | Label 2 |
|---|---|---|
| 1100865 | Documentation | Diagnostic Studies |
| 1100866 | Documentation | Diagnostic Studies |

SYSTEM AND METHOD FOR DECREASING TURNAROUND FOR PRE-AUTHORIZATIONS USING A SMART REQUEST FOR INFORMATION MODEL

CROSS-REFERENCE TO RELATED APPLICATIONS

This application claims the benefit of U.S. Provisional Patent Application No. 63/228,917 filed Aug. 3, 2021 entitled "System and Method for Decreasing Turnaround for Pre-Authorization Using a Smart Request for Information Model", which is incorporated by reference herein in its entirety.

TECHNICAL FIELD

This application relates generally to user interfaces for pre-authorization and more particularly to enhancing the efficiency and turnaround time for medical pre-authorization systems.

BACKGROUND

A large portion of the time required to provide a decision for a medical pre-authorization request has historically been invested in contacting a provider's office for missing clinical information, greatly impacting a patient's ability to obtain the treatment he or she needs. Current solutions allow the individual submitting a pre-authorization request to enter textual information and attach documents that he or she views as relevant. This is limited by the experience of nonclinical staff submitting the request, which can greatly differ across provider organizations.

Attestation-based solutions are available to capture additional clinical information before a pre-authorization request is submitted for review. Such solutions are based on deterministic algorithms and require the individual submitting a pre-authorization request to answer multiple questions, thereby also requiring the submitter to have clinical knowledge, which is typically uncommon among users submitting a pre-authorization request. Current solutions allow the submitter of a pre-authorization request to enter textual information and attach documents that he or she deems might be relevant for the review. This is limited by the experience of the nonclinical staff submitting the request, which also can vastly vary across provider organizations. Current systems are deficient in their ability to guide and provide recommendations regarding the clinical documents needed for pre-authorization requests.

SUMMARY

A system of one or more computers can be configured to perform particular operations or actions by virtue of having software, firmware, hardware, or a combination thereof that in operation cause the system to perform the actions. One or more computer programs can be configured to perform particular operations or actions by virtue of including instructions that, when executed by a data-processing apparatus, cause the apparatus to perform the actions. One general aspect includes a method for processing pre-authorization requests and reducing pre-authorization turnaround time. The method may also include receiving historical data such as historical pre-authorization requests and clinical information associated with historical pre-authorization requests. The method may also include receiving real-time data using an application programming interface (API) gateway including real-time pre-authorization requests where the real-time data includes the real-time pre-authorization procedure and a clinical document category. The method may also include removing irrelevant data from real-time data and historical data to produce clean historical data and clean real-time data. The method may also include extracting data features required to train a machine learning model from the clean historical data and clean real-time data. The method may also include training the machine learning model by applying the extracted data features from the clean historical data and clean real-time data. The method may also include identifying prediction data results by applying the trained machine learning model. The method may also include storing the prediction data results in a request-for-information (RFI) database. The method may also include receiving a request for prediction data results. The method may also include providing the prediction data results. Other embodiments of this aspect include corresponding computer systems, apparatuses, and computer programs recorded on one or more computer storage devices, each configured to perform the actions of the methods.

Implementations may include one or more of the following features. The method may include extracting features where extracting features may include creating, using historical data, a multilabel feature mapping between clinical text and a respective clinical category; training a multilabel classification model by applying multilabel feature mapping between the clinical information and respective clinical categories; for each respective clinical text of a plurality of clinical text associated with respective procedure codes: reading respective clinical text associated with a respective procedure code, applying the multilabel classification model to identify and associate the respective procedure code with a respective clinical category; and updating the extracted features to include, for respective procedure codes, a list of respective identified document categories. Applying the machine learning model may include executing procedure code in the multilabel classification model to obtain relevant clinical document categories; obtaining results for clinical information that are required for a medical procedure and/or diagnosis; and updating database procedure code with results for clinical information that is required at intake. Implementations of the described techniques may include hardware, a method or process, or computer software on a computer-accessible medium.

The method may also include identifying whether clinical information in historical data and real-time data contains free-form text; in response to identifying that clinical information in historical data and real-time data contains free-form text: (i) removing stop words, (ii) extracting all sentences, and (iii) removing nonclinical sentences by comparing against a standard nonclinical dictionary to produce clean historical data and clean real-time data for extracting data features; and, in response to identifying that clinical information in historical data and real-time data does not contain free-form text, identifying the historical data and real-time data as clean historical data and clean real-time data for extracting data features. Other embodiments of this aspect include corresponding computer systems, apparatuses, and computer programs recorded on one or more computer storage devices, each configured to perform the actions of the methods.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

DETAILED DESCRIPTION

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

The disclosed implementations provide systems (e.g., server systems and client devices) and methods of processing pre-authorization requests, including providing proactive guidance to an individual submitting a pre-authorization request (also referred to as a submitter) to provide relevant clinical information (i.e., request-for-information (RFI) systems). Such systems and methods can be used by healthcare insurance companies to reduce the turnaround time required for pre-authorization review. The systems and methods of the present application provide many benefits over current pre-authorization systems, including a decrease in average handling time for pending pre-authorization cases; a decrease in provider calls pertaining to lack of information; increased provider satisfaction in resolving cases in a timely manner; easy integration into provider platforms, systems and applications; increased accuracy of recommendations over time using machine learning; and greater accuracy of clinical outcomes from providers. In one instance, the system may analyze structured and unstructured historical data to identify clinical information that may be required for a medical procedure. The identified clinical information may be used as a checklist by a pre-authorization request submitter so that clinical data is available upfront, decreasing the time normally lost when clinical data is not provided upfront.

Figure 1:
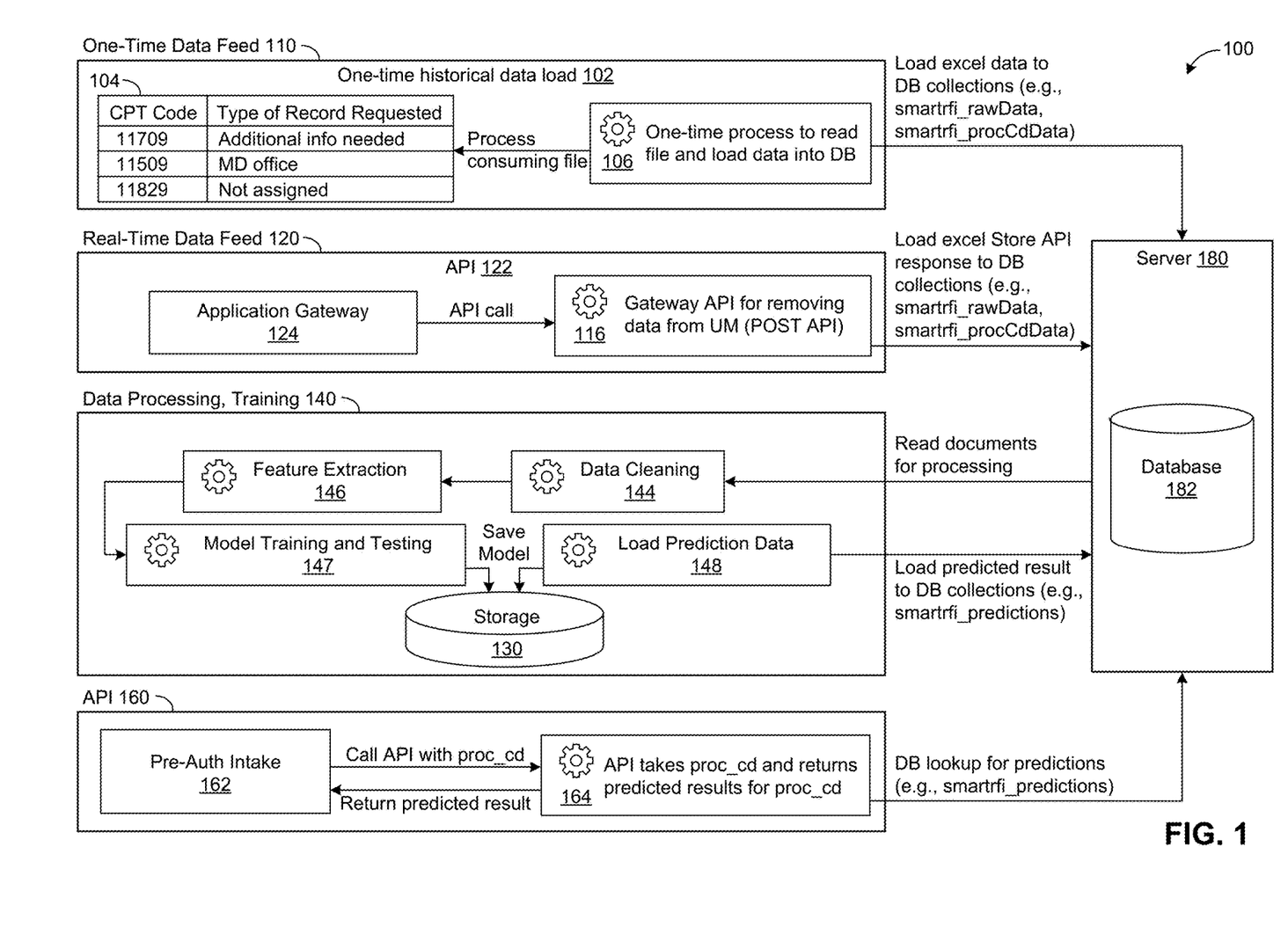
FIG. 1 illustrates a system diagram of a pre-authorization request-for-information (RFI) system, in accordance with some embodiments.

FIG. 1 shows an implementation of a pre-authorization RFI system 100, in accordance with some embodiments.

System 100 includes a server 180, which is configured to process RFIs and provide the requested information to the requesting user. Server 180 includes or is communicatively coupled to a database (DB) 182, which is configured to store data that may be required to produce information responsive to a request from a user.

Server 180 includes or is communicatively coupled to a one-time data feed module 110, which is configured to receive a one-time data feed. The one-time data feed contains information regarding procedure and diagnosis codes and the corresponding medical records that have been requested in past pre-authorization requests. One-time data feed module 110 may be configured to load historical data containing a pre-authorization request and clinical information that was requested by a user (e.g., medical records requested by a professional in the course of determining whether a particular medical procedure can be pre-authorized for a customer or patient).

One-time data feed module 110 includes a one-time historical data load module 102, which may be a one-time process to load historical data into database 182. The data feed may be in a structured format, such as an Excel file. One-time data feed module 110 may be configured to parse the data feed into a format suitable for database 182. One-time historical data load 102 can include one or more codes corresponding to Current Procedural Terminology (CPT) codes 104. Example CPT codes include CPT code 11709 (indicating additional information is needed), CPT code 11509 (indicating a medical doctor's office), and CPT code 11829 (indicating not assigned). One-time process 106 may be a one-time process to read a file (e.g., an Excel file) of a user for an existing pre-authorization request and load the data from the file into database 182.

Server 180 includes or is communicatively coupled to a real-time data feed module 120. Real-time data feed module 120 can leverage an application gateway (e.g., application gateway 124) to load real-time pre-authorization data and clinical information for pre-authorization requests that are currently being utilized by third parties. This data is loaded into database 182. Real-time data feed module 120 can include the procedure code for a procedure being requested and clinical information data related to the procedure. Clinical information data can include one or more specific clinical document categories that are requested. If the clinical document category is from a list of items already in database 182, then it is directly associated with the procedure code into database 182. If the clinical document category consists of human-generated notes, then the clinical information data is subjected to a subsequent cleaning process (described below in data cleaning module 144 and FIG. 2).

Real time data feed module 120 may include API module 122. API module 122 may include application gateway 124 and gateway API 116. Application gateway 124 may be configured to receive data from any external utilization management (UM) system. Gateway API 116 may be configured to provide data to or receive data from a UM status tracker during a post-API process. For example, for every new pre-authorization request, the UM system may send procedure and diagnosis information along with a requested medical record.

Database 182 may include raw data, processed data, and predictions data. Raw data corresponds to additional data that the UM reviewer requested the provider to provide in order to support the pre-authorization request. Processed data corresponds to data representing the information that was requested for a procedure code. Predictions data corresponds to one or more categories of records associated with a procedure code. Examples may include a category of documents that may be needed for admission summary, lab results, and so forth.

Server 180 includes or is communicatively coupled to a data processing and training module 140, which includes data cleaning module 144, feature extraction module 146, model training and testing module 147, load prediction data module 148, and local storage 130 (also referred to as a database).

Data cleaning module 144 can clean data that is not relevant from the one-time data feed module 110 and real-time data feed module 120. An example method for performing data cleaning is described below with reference to FIG. 2.

Feature extraction module 146 can extract features that are required to train a machine learning model. In feature extraction module 146, a batch process can read the clinical text associated with each procedure code and subsequently use the classification model from data cleaning module 144 to identify the list of document categories. The procedure code is then updated to include the additional document categories. Feature extraction module 146 contains a repository of clinical text and associated document category. An example of feature extraction includes a multilabel feature mapping between clinical text and clinical categories. Another example of feature extraction includes multilabel feature mapping between procedure codes and clinical categories. This information is labeled and/or received from one-time historical data load 102. An example method for performing feature extraction is described in FIG. 3.

Data and features are extracted in load predication data module 148 and are used to train a machine learning classification model that maps clinical text and/or procedure codes to clinical document categories and/or classifies clinical text, procedure codes, and/or clinical document categories. Model training and testing module 147 can be executed for multiple procedures to identify relevant clinical documents and categories, and results are stored in local storage 130. The results stored can include the clinical documents and categories most likely to be required for a medical procedure. An example method for performing model training by modules 147 and/or 148 is described in FIG. 4.

Server 180 includes or is communicatively coupled to an API module 160, which provides an API 164 that can be used from pre-authorization intake system 162 to check for or request clinical information that is most likely to be required for a medical procedure and/or diagnosis. The API refers to the prediction data loaded in database 182 to identify missing clinical information. The API provides the relevant information back to the requester.

Figure 2:
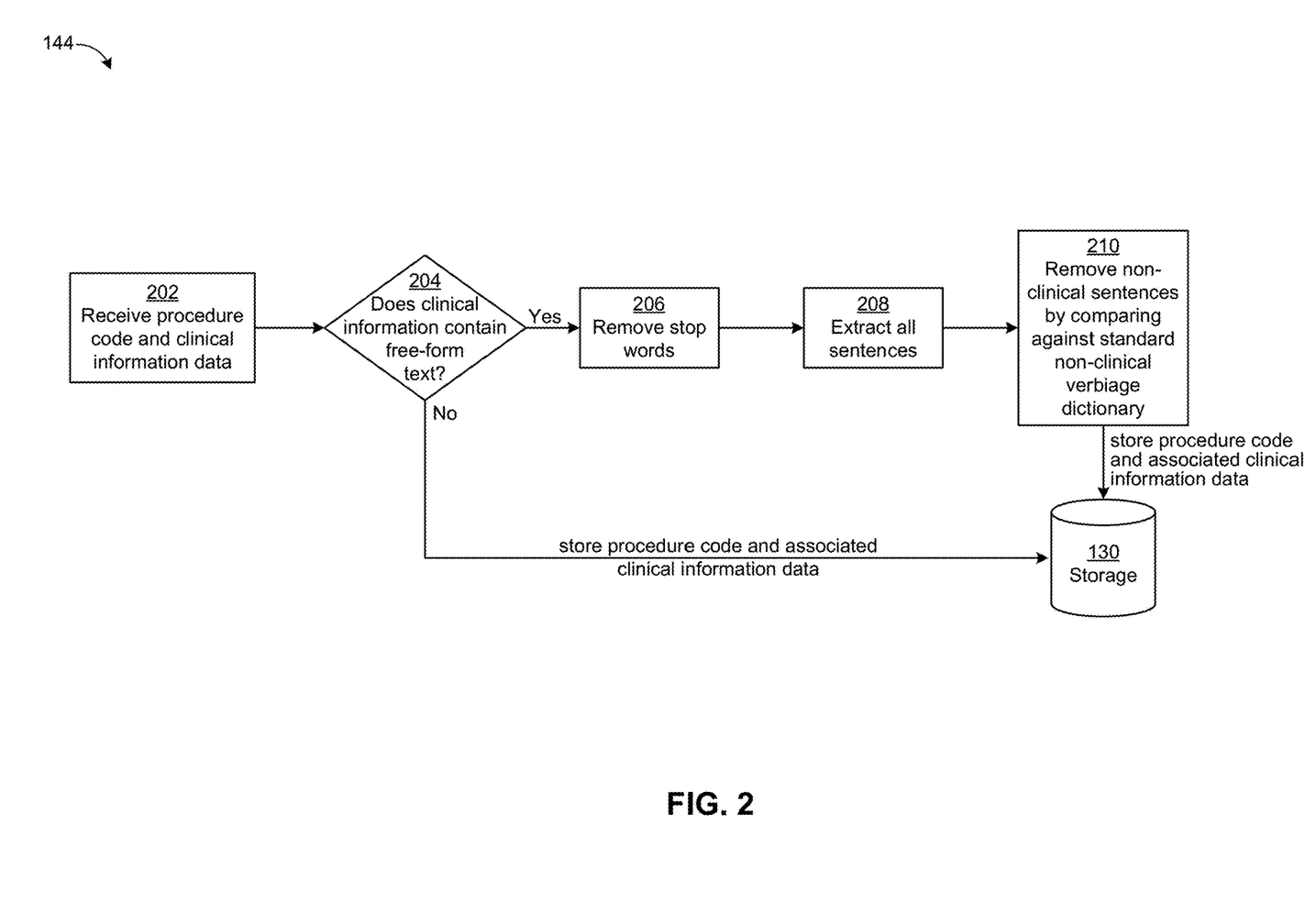
FIG. 2 is an exemplary flow diagram corresponding to operations performed by data cleaning module 144 represented in FIG. 1, in accordance with some embodiments.

FIG. 2 is an exemplary flow diagram corresponding to operations performed by data cleaning module 144 represented in FIG. 1, in accordance with some embodiments.

At operation 202, data cleaning module 144 receives procedure code and clinical information data from database 182. Procedure codes may be defined as Current Procedure Terminology (CPT) codes, Healthcare Common Procedure Coding System (HCPCS) codes, or any other type of codes associated with a medical procedure. Clinical information data may be defined as any clinical data associated with a medical procedure, such as lab results, progress notes, and the like.

At operation 204, data cleaning module 144 determines if the procedure code and clinical information data from database 182 is free-form text. If it is determined that the procedure code and clinical information data from database 182 is not free-form text, the procedure code and clinical information data from database 182 is stored in local storage 130.

At operation 206, if the procedure code and clinical information data from database 182 is free-form text, data cleaning module 144 removes stop words from the free-form text. Examples of stop words include "a," "the," "is," and "are."

At operation 208, data cleaning module 144 parses and extracts all sentences. Each sentence is then individually compared against a list of nonclinical text from a predefined repository.

At operation 210, the nonclinical sentences may be removed from the notes. The remaining clinical notes are associated and saved with the procedure code in local storage 130. If procedure code and clinical information data from database 182 is not free-form text, data cleaning module 144 stores procedure code and associated clinical information data in local storage 130.

Figure 3:
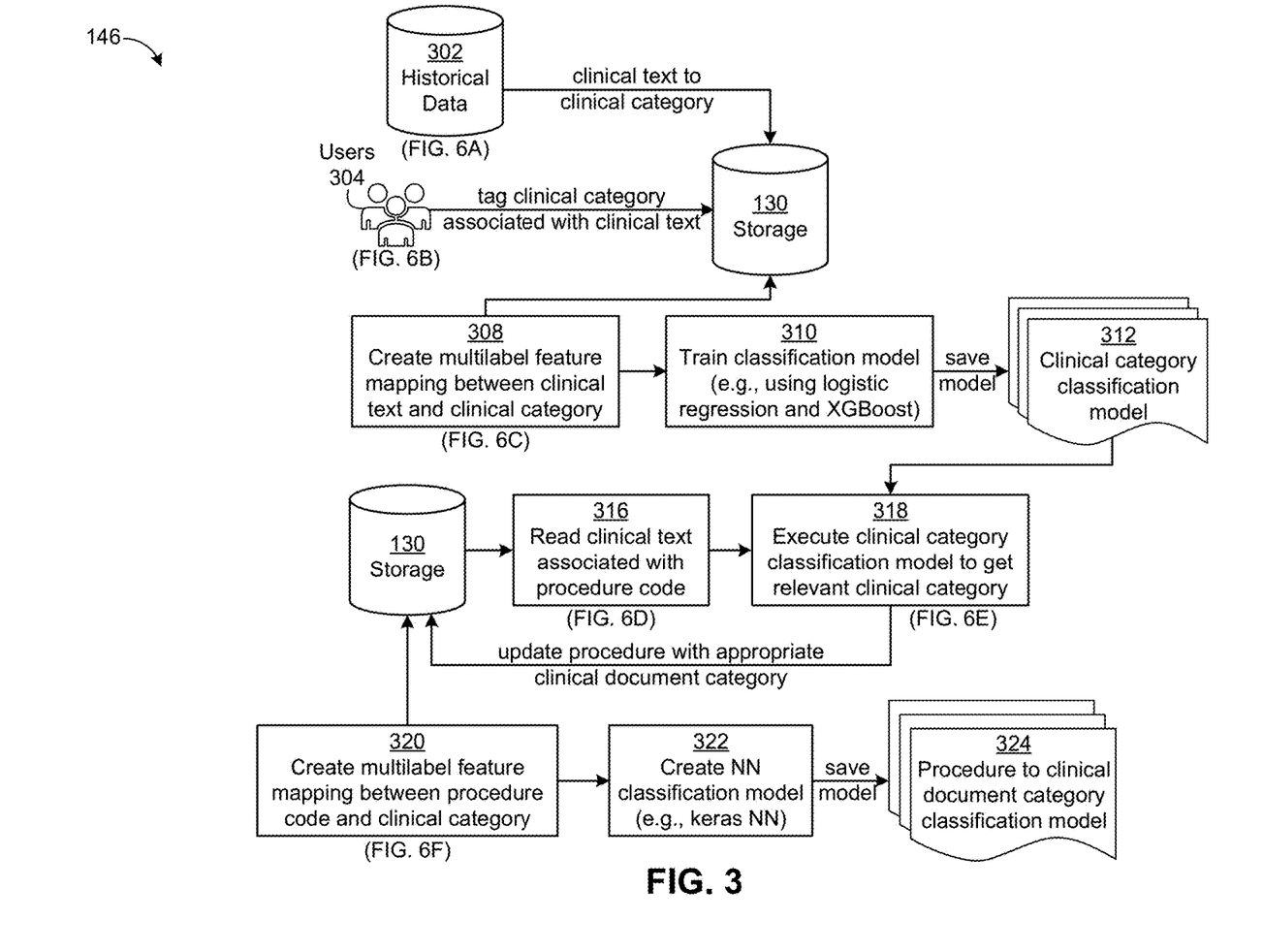
FIG. 3 is an exemplary flow diagram corresponding to operations performed by feature extraction module 146 represented in FIG. 1, in accordance with some embodiments.

FIG. 3 is an exemplary flow diagram corresponding to operations performed by feature extraction module 146 represented in FIG. 1, in accordance with some embodiments.

Figure 6A:
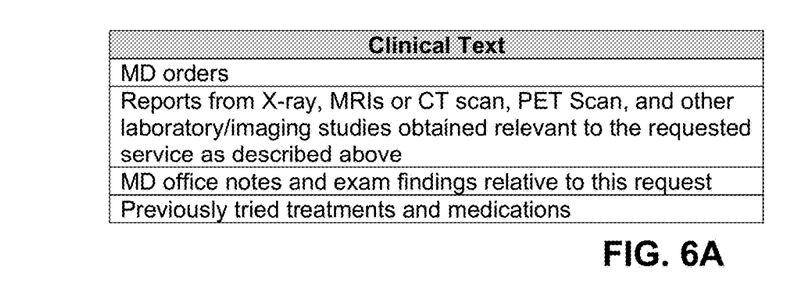
FIGS. 6A-6F are exemplary data structures used by feature extraction module 146 represented in FIG. 1, in accordance with some implementations.

At operation 302, historical data is sent to local storage 130, assigning the clinical text in the historical data to a clinical category. While clinical text includes detailed descriptions (e.g., a requested medical record, documentation of BMI, visit notes, lab results, and so forth), clinical category represents a high-level categorization of the descriptions in the clinical text (e.g., a type or classification of a requested medical record, such as "bariatric documentation," "dental record," "doctor note," "lab result," and so forth). Some examples of clinical text sent to storage 130 in this operation are depicted in FIG. 6A. For example, one example of clinical text is "MD orders," another example of clinical text is "Reports from X-ray, MRIs or CT scan, PET Scan, and other laboratory/imaging studies obtained relevant to the requested service as described above," another example of clinical text is "MD office notes and exam findings relative to this request," and another example of clinical text is "Previously tried treatments and medications." The examples in FIG. 6A are for illustrative purposes and are not meant to be limiting.

Figure 6B:
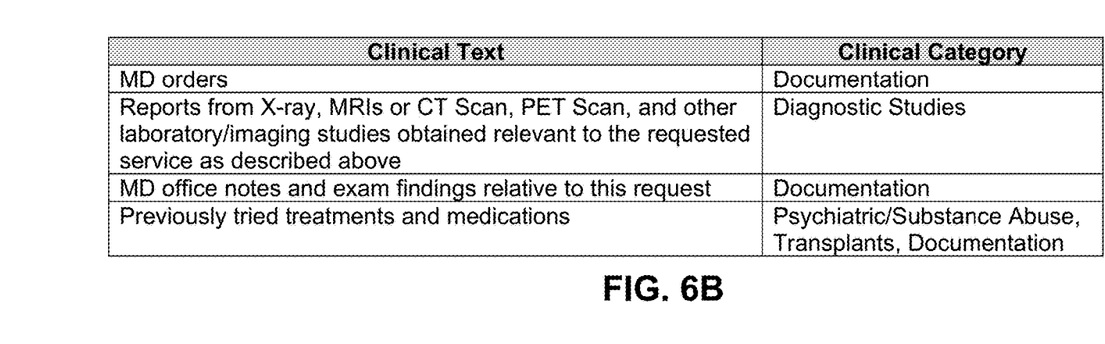

At operation 304, clinical categories associated with clinical text may be tagged and saved to local storage 130. Associating clinical text with a respective clinical category creates structured clinical training feature data used for training machine learning models. In some embodiments, the system uses a predefined mapping (of clinical text to clinical categories) created by clinicians to associate the clinical text with respective clinical categories. Some examples of clinical categories that are associated with corresponding clinical text in this operation are depicted in FIG. 6B. For example, the MD orders may be assigned the clinical category of "Documentation," the reports may be assigned the clinical category of "Diagnostic Studies," the MD office notes and exam findings may be assigned the clinical category of "Documentation," and the previously tried treatments and medications may be assigned the clinical category of "Psychiatric/Substance Abuse, Transplants, Documentation." The examples in FIG. 6B are for illustrative purposes and are not meant to be limiting.

Figure 6C:
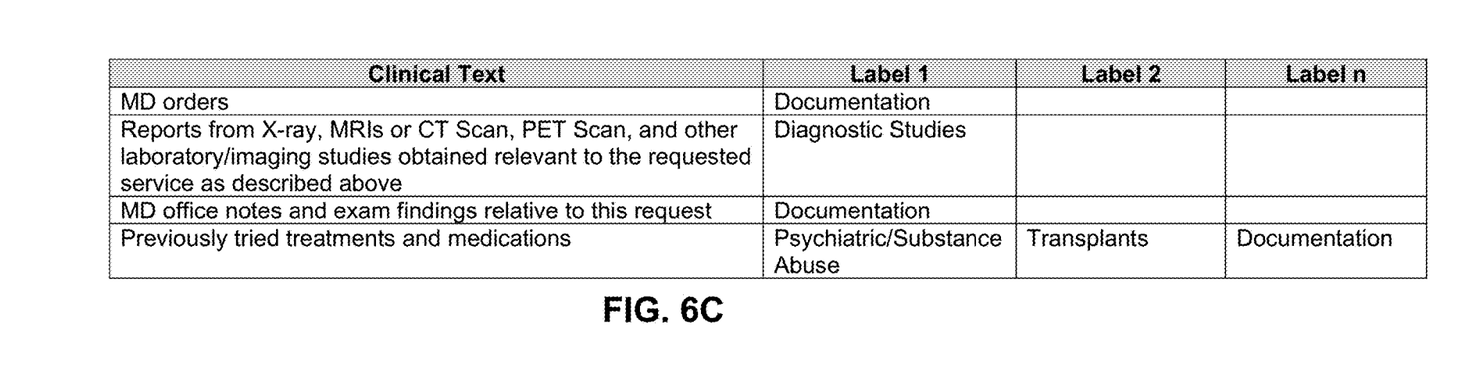

At operation 308, multilabel feature labels can be created between clinical text and clinical categories and saved to local storage 130. A multilabel classification algorithm may be used, in which each label represents a clinical category. Some examples of this multilabel approach are depicted in FIG. 6C. For example, the clinical category of "Documentation" is assigned as a label for clinical text "MD orders," the clinical category of "Diagnostic Studies" is assigned as a label for clinical text "Reports . . . as described above," the clinical category "Documentation" is assigned as a label for clinical text "MD office notes and exam findings relative to this request," and the "Psychiatric/Substance Abuse, Transplants, Documentation" clinical category is separated into three labels—"Psychiatric/Substance Abuse" (Label 1), "Transplants" (Label 2), and "Documentation" (Label 3), each of which is assigned as a label for clinical text "Previously tried treatments and medications." The examples in FIG. 6C are for illustrative purposes and are not meant to be limiting.

At operation 310, a clinical category classification machine learning model can be trained and saved. In some embodiments, the clinical category classification machine learning model can be trained using the structured clinical training data. For example, the machine learning model may use the clinical text as inputs and the clinical category labels (e.g., Labels 1-3) as labels for the input clinical text. Examples of machine learning models may include logistic regression and XGBoost.

At operation 312, a clinical category classification model may be created. Once created, the clinical category classification machine learning model may be used to process clinical data (e.g., clinical text received after the "previously tried treatments and medications" in FIG. 6C) and, based on the respective clinical text identified in the clinical data, select a respective one or more clinical categories.

Figure 6D:
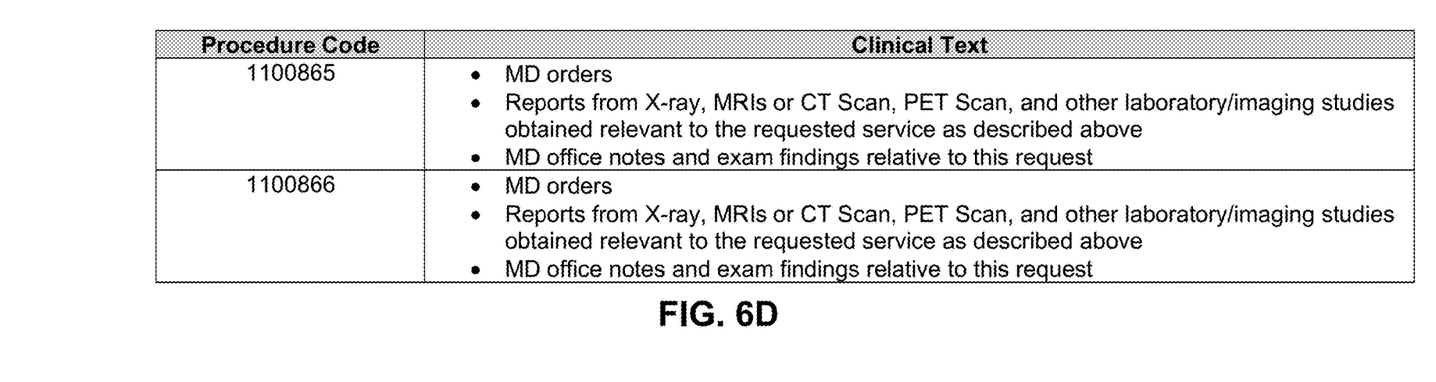

At operation 316, new clinical text and clinical data is read with associated procedure code and provided to the clinical category classification machine learning model for further processing. Examples of clinical text and data with associated procedure codes are depicted in FIG. 6D. For example, procedure code 1100865 is associated with clinical text including "MD orders," "Reports . . . as described above," and "MD office notes and exam findings relative to this request," and procedure code 1100866 is associated with clinical text including "MD orders," "Reports . . . as described above," and "MD office notes and exam findings relative to this request." The examples in FIG. 6D are for illustrative purposes and are not meant to be limiting.

Figure 6E:
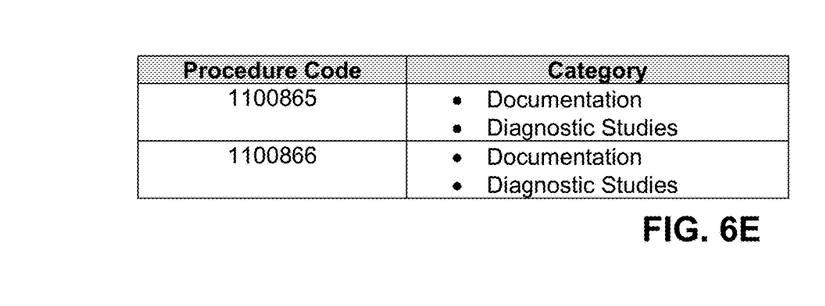

At operation 318, the clinical category classification machine learning model may be executed to obtain relevant clinical categories (e.g., the clinical categories in FIG. 6E) from new clinical text and clinical data (e.g., the clinical text in FIG. 6D), and update procedure codes with appropriate clinical document category data. The updated procedure code with appropriate clinical document category data may then be saved to local storage 130. Examples of updated procedure codes with appropriate clinical document categories are depicted in FIG. 6E. For example, procedure code 1100865 is updated to be associated with clinical categories "Documentation" and "Diagnostic Studies," and procedure code 1100866 is updated to be associated with clinical categories "Documentation" and "Diagnostic Studies." The examples in FIG. 6D are for illustrative purposes and are not meant to be limiting.

Figure 6F:
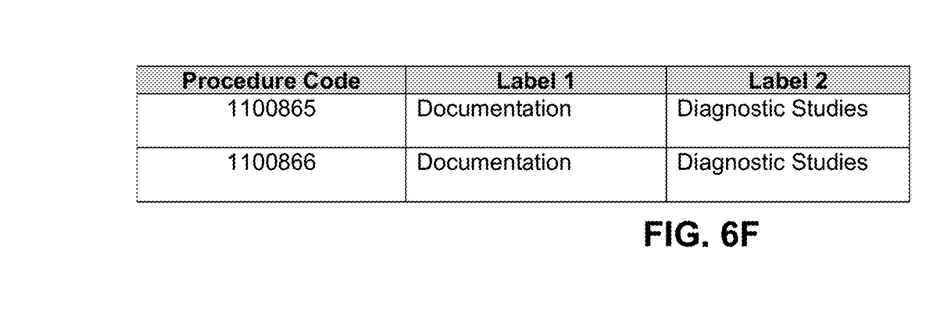

At operation 320, multilabel feature mapping is created between procedure code and clinical category. In some embodiments, the multilabel feature mapping is saved to local storage 130. Some examples of this multilabel approach are depicted in FIG. 6F. For example, the "Documentation" and "Diagnostic Studies" categories for procedure code 1100865 are separated into two labels—"Documentation" (Label 1), and "Diagnostic Studies" (Label 2), each of which is assigned as a label for procedure code 1100865. Likewise, the "Documentation" and "Diagnostic Studies" categories for procedure code 1100866 are separated into two labels—"Documentation" (Label 1), and "Diagnostic Studies" (Label 2), each of which is assigned as a label for procedure code 1100866. The examples in FIG. 6F are for illustrative purposes and are not meant to be limiting. The multilabel feature mapping may be used as feature data to train the procedure to the clinical document category machine learning model described in more detail below. Examples of multilabel feature mapping created between procedure code and clinical category may include a relationship between a procedure code and a clinical category such as "Procedure code 99234 requires document for Admission Summary, Lab Results." Associating procedure codes with a respective clinical category creates structured clinical training data used for training machine learning models.

At operation 322, a procedure code to clinical document category machine learning model is trained. In some embodiments, the procedure code to clinical document category machine learning model is trained as a neural network classification model. Once created, the procedure code to clinical document category classification machine learning model generates structured procedure code to clinical document category classifications that can be used for the procedure code classification performed by model training and testing module 147 in FIG. 1. Examples of structured procedure code to clinical document category classifications may include a relationship between a procedure code and a clinical category such as "Procedure code 99234 requires document for Admission Summary, Lab Results." For an example usage of such a model, referring to FIG. 6F, if subsequent procedure code (e.g., 1100867) is processed (e.g., as part of operations 404-408 below) after the model has been trained, the model may be used to assign the subsequent procedure code to one or more document categories based on which labels the model outputs.

At operation 324, the procedure code to clinical document category classification machine learning model is saved.

Figure 4:
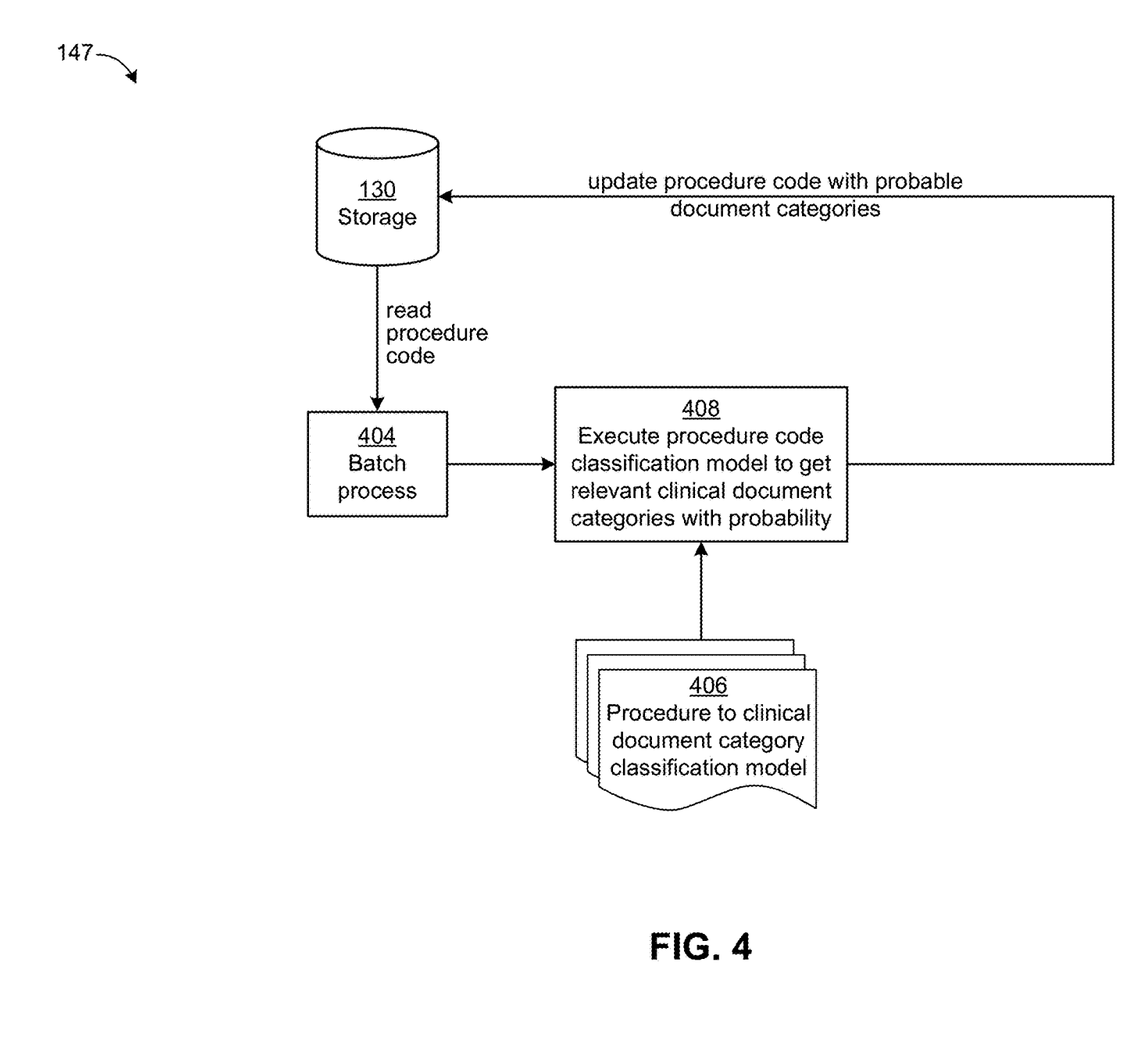
FIG. 4 is an exemplary flow diagram corresponding to operations performed by model training and testing module 147 represented in FIG. 1, in accordance with some embodiments.

FIG. 4 is an exemplary flow diagram corresponding to operations performed by model training and testing module 147 represented in FIG. 1, in accordance with some embodiments.

At operation 404, one or more new procedure codes, clinical data, and/or clinical document category data are read from local storage 130.

At operation 406, the procedure code to clinical document category classification machine learning model is read from local storage 130.

At operation 408, the procedure code to clinical document category classification machine learning model is executed. When executed, the procedure code to clinical document category classification machine learning model produces relevant clinical document categories (e.g., the categories in FIG. 6E) with probabilities for each respective procedure code identified in the new procedure codes, clinical data, and clinical document category data read from local storage 130. The result contains the clinical information that is most likely to be required for a medical procedure and/or diagnosis. An example of relevant clinical document categories with probabilities produced for each respective procedure code may be "Procedure code 99234 requires document for Admission Summary with a probability of 90%, and Lab Results with a probability of 86%." In some embodiments, the probabilities are determined based on how frequently clinical documents have been requested for respective procedures.

Figure 5:
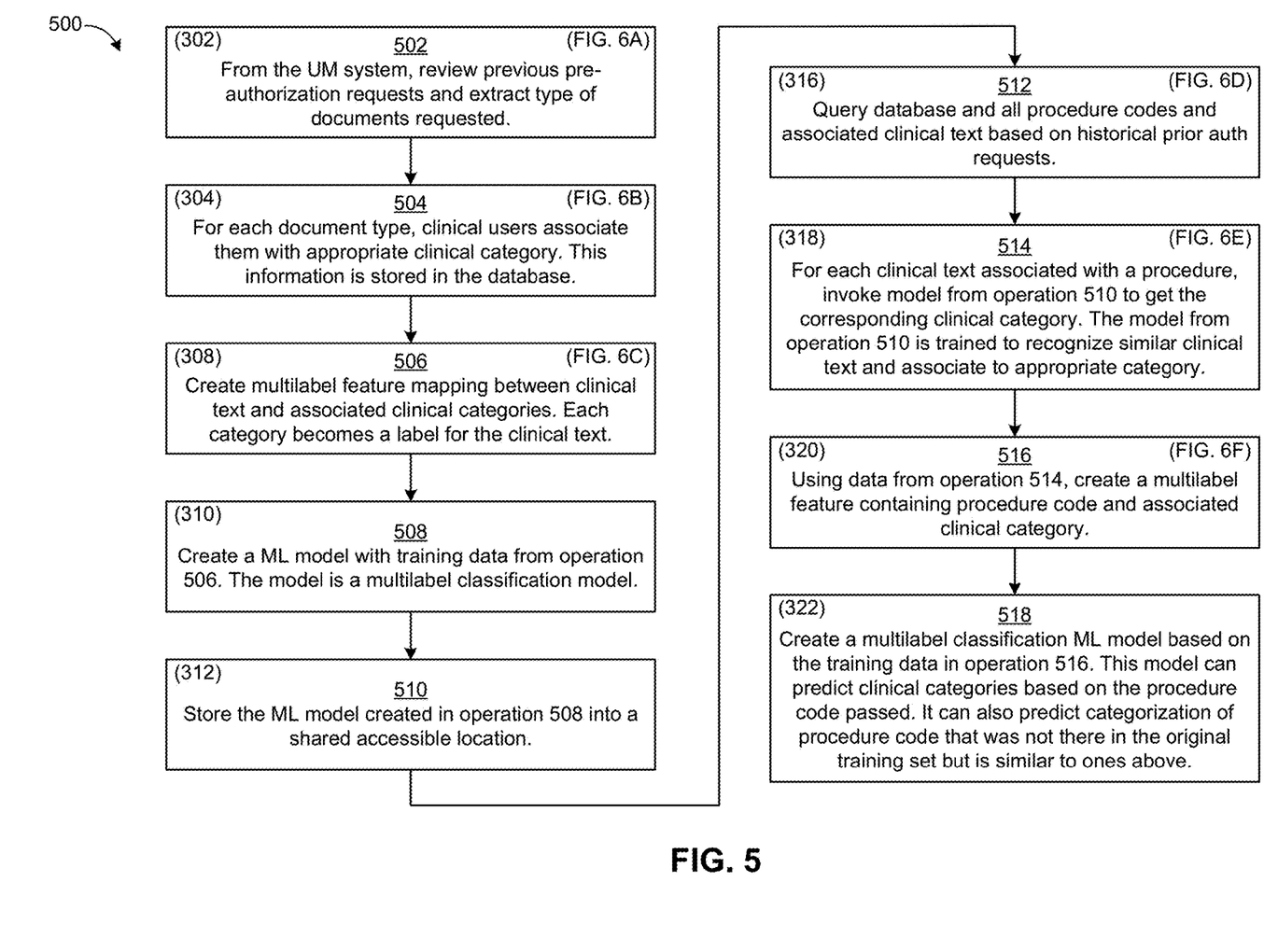
FIG. 5 is another exemplary flow diagram corresponding to operations performed by feature extraction module 146 represented in FIG. 1, in accordance with some embodiments.

FIG. 5 is another exemplary flow diagram corresponding to operations performed by feature extraction module 146 represented in FIG. 1, in accordance with some embodiments.

In operation 502, the UM system reviews previous pre-authorization requests and extracts types of documents requested. This operation corresponds to operation 302 described above, using clinical text (e.g., as depicted in FIG. 6A).

In operation 504, clinical users associate each document type with an appropriate clinical category. This information is stored in the database. This operation corresponds to operation 304 described above, using clinical text and associated clinical categories (e.g., as depicted in FIG. 6B).

In operation 506, module 146 create multilabel feature mappings between clinical text and associated clinical categories. Each category becomes a label for the clinical text. This operation corresponds to operation 308 described above, using multilabel feature mapping (e.g., as depicted in FIG. 6C).

In operation 508, module 146 create a machine learning (ML) model with training data from operation 506 (from the multilabel feature mappings). The model is a multilabel classification model. This operation corresponds to operation 310 described above, using multilabel feature mappings (e.g., as depicted in FIG. 6C).

In operation 510, module 146 stores the ML model created in operation 508 into a shared accessible location. This operation corresponds to operation 312 described above.

In operation 512, module 146 queries the database and all (or a portion of all) procedure codes and associated clinical text based on historical prior auth requests. This operation corresponds to operation 316 described above, using procedure codes and associated clinical text (e.g., as depicted in FIG. 6D).

In operation 514, for each clinical text entry associated with a procedure code, module 146 invokes the model from operation 510 to obtain one or more corresponding clinical categories. The model from operation 510 is trained to recognize similar clinical text and associate the clinical text to one or more appropriate clinical categories. This operation corresponds to operation 318 described above, using procedure codes and associated clinical categories (e.g., as depicted in FIG. 6E).

In operation 516, using clinical category data from operation 514, module 146 creates a multilabel feature containing procedure codes and associated categories. This operation corresponds to operation 320 described above, using procedure codes and associated category labels (e.g., as depicted in FIG. 6F).

In operation 518, module 146 creates a multilabel classification ML model based on the training data set obtained in operation 516. This model can predict one or more clinical categories based on the procedure code passed. It can also predict the categorization of procedure codes that were not there in the original training set but are similar to previously processed procedure codes. This operation corresponds to operation 322 described above.

FIGS. 6A-6F are exemplary data structures used by feature extraction module 146 represented in FIG. 1, in accordance with some embodiments. These data structures are described with reference to FIGS. 3-5 above, and they are depicted as examples for illustrative purposes.

Figure 7:
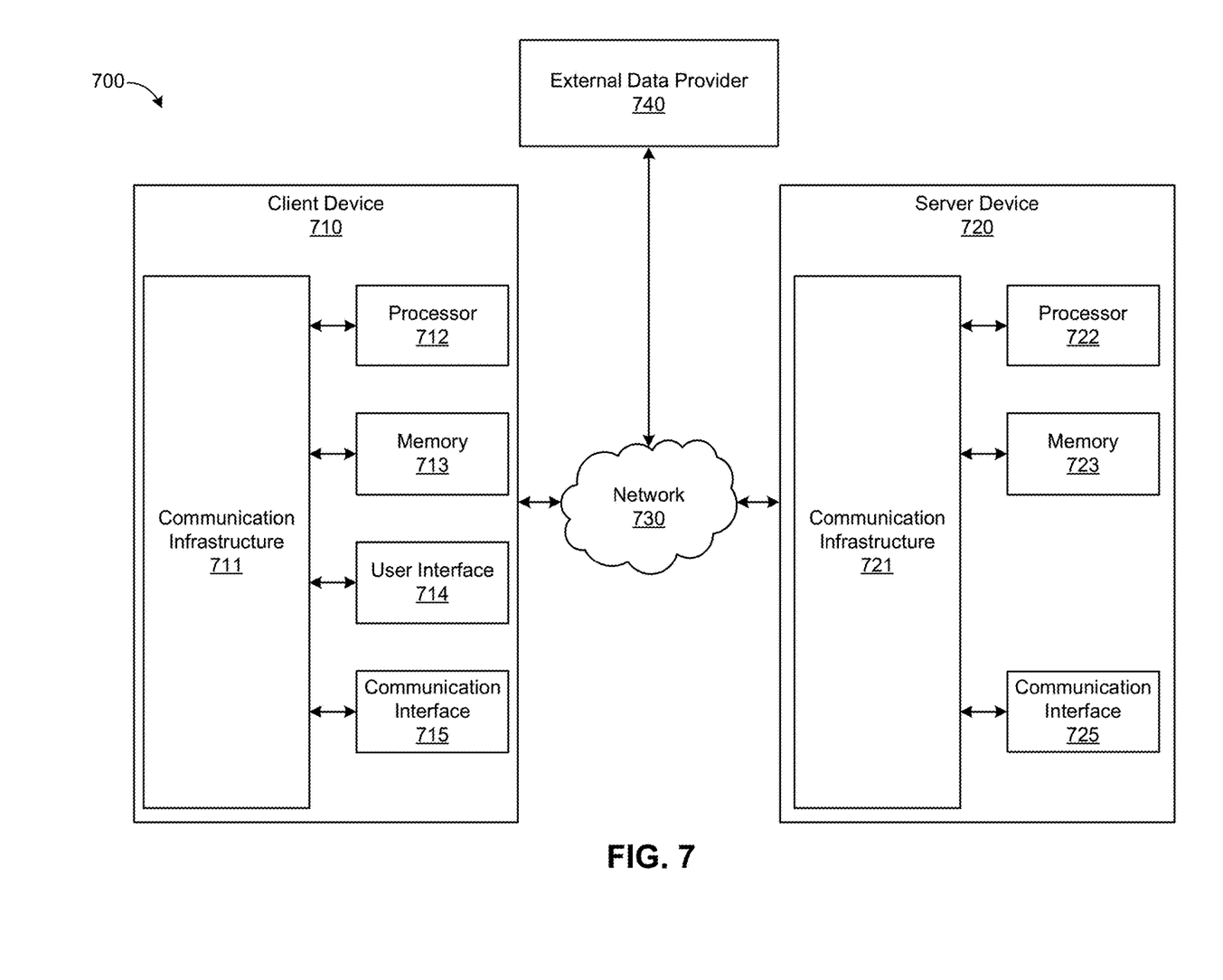
FIG. 7 is an exemplary system diagram of the pre-authorization RFI system represented in FIG. 1, in accordance with some embodiments.

FIG. 7 shows a block diagram that illustrates system 700 for improving personalized provider searches according to at least one aspect of the present invention. While some example features are illustrated, various other features have not been illustrated for the sake of brevity and so as not to obscure pertinent aspects of the example aspects disclosed herein. To that end, in at least one aspect, system 700 may include one or more computers or servers, non-transitory memory operable to store one or more computer programs, and one or more processors to implement the one or more computer programs. For example, system 700, shown in FIG. 7, may include client device 710 (which, in some embodiments, may be configured to interact with API 160), server device 720 (which, in some embodiments, corresponds to server 180 of FIG. 1), external data provider 740 (which, in some embodiments, may be associated with one-time data feed module 110 and real-time data feed module 120) and network 730.

Client device 710 may be a computing device for receiving inputs from a user (e.g., a member), requesting data from server device 720 via network 730 and/or displaying data from service device 720 at the request of a user. Examples of client device 710 may include a smartphone, tablet or a personal computer, among others.

Server device 720 may be any computing device, including one or more software modules (e.g., a scoring module) for receiving and/or responding to requests for data from client device 710. Examples of data may include web page data, hypertext markup language (HTML), text, video, audio as a free-form speech describing symptoms and conditions, pictures, software, executable, interpretable, byte-code, and binary files. In some aspects, server device 720 may be a plurality of computing devices that process the request from client device 710. Server device 720 may be configured to process requests from other computing devices in parallel with the request from client device 710.

In one aspect, server device 720 is a web server that hosts a website. Client device 710 may be configured to request provider recommendations from server device 720 based on a hypertext transfer protocol (HTTP). Server device 720 may respond to a provider recommendation request by sending provider recommendation data (e.g., an ordered list of providers) to client device 710. In one aspect, provider recommendation data may include web page data included on an HTML web page. While server device 720 may be configured for HTTP/HTML requests and responses, as described in the exemplary aspect above, system 700 is not limited to the use of HTML or HTTP, and those aspects of the present invention can be used with any computer communication language or network protocol suitable for the purposes of the described communications between client device 710 and server device 720.

Client device 710 may include communication infrastructure 711, processor 712, memory 713, user interface 714 and communication interface 717. Server device 720 may include communication infrastructure 721, processor 722, memory 723 and communication interface 727.

Processor 712 or processor 722 may be any type of processor, including but not limited to a special-purpose digital signal processor. Processor 712 is connected to communication infrastructure 711 (for example, a bus or network). Processor 712 is connected to communication infrastructure 721 (for example, a bus or network). Various software implementations are described in terms of this exemplary computer system.

Memory 713 or memory 723 may include one or more of random access memory (RAM), a hard-disk drive and a removable storage drive, such as a floppy disk drive, a magnetic tape drive, or an optical disk drive, etc. The removable storage drive may read from and/or write to a removable storage unit. The removable storage unit can be a floppy disk, a magnetic tape, an optical disk, etc., which is read by and written to a removable storage drive. Memory 713 and/or memory 723 may include a computer-usable storage medium having stored therein computer software programs and/or data to perform any of the computing functions of client device 710 and/or server device 720. Computer software programs (also called computer control logic), when executed, enable client device 710 and/or server device 720 to implement aspects of the present invention as discussed herein. Accordingly, such computer software programs represent controllers of client device 710 and/or server device 720. Memory 723 may include one or more data stores that store data such as web page data, software files or any other types of data files. Server device 720 may retrieve the data from memory 723 before transmitting to client device 710 via network 730. Memory 723 may include member characteristics, provider characteristics, member-provider interaction characteristics, feature bias weightings, member/provider bias weightings, and learnt weightings, among others described herein.

User interface 714 may be produced by a program that controls a display (not shown) of client device 710. User interface 714 may include one or more peripheral user interface components, such as a keyboard or a mouse. The user may use the peripheral user interface components to interact with client device 710. User interface 714 may receive user inputs, such as mouse inputs or keyboard inputs from the mouse or keyboard user interface components. User interface 714 may display data, such as web pages, on the display of client device 710 using a web browser. While user interface 714 may be configured for displaying data using a web browser, as described in the exemplary aspect above, user interface 714 is not limited to displaying data using a web browser, and those aspects of the present invention may contemplate using other display devices or software suitable for the purposes of the displaying the data.

Communication interface 717 and/or communication interface 727 allow data to be transferred between client device 710 and server device 720 via network 730. Examples of communication interface 717 or communication interface 727 may include a modem, a network interface (such as an Ethernet card), a communication port, a Personal Computer Memory Card International Association (PCMCIA) slot and card, etc. Data transferred via communication interface 717 or communication interface 727 are in the form of signals, which may be electronic, electromagnetic, optical, or other signals capable of being transmitted or received by communication interface.

Network 730 connects client device 710, server device 720 and external data provider 740 by carrying signals. Network 730 may be implemented using wire or cable, fiber optics, a phone line, a wireless link, a cellular phone link, a radio frequency link, or any other suitable communication channel. For instance, network 730 may be implemented using a combination of channels. Network 730 may be implemented as an intranet and/or an internet.

Many modifications and variations of this disclosure can be made without departing from its spirit and scope, as will be apparent to those skilled in the art. The specific implementations described herein are offered by way of example only, and the disclosure is to be limited only by the terms of the appended claims, along with the full scope of equivalents to which such claims are entitled.

It will be understood that, although the terms first, second, etc., are, in some instances, used herein to describe various elements, these elements should not be limited by these terms. These terms are only used to distinguish one element from another. For example, a first widget could be termed a second widget, and, similarly, a second widget could be termed a first widget, without departing from the scope of the various described implementations. The first widget and the second widget are both widgets, but they are not in the same condition unless explicitly stated as such.

The terminology used in the description of the various described implementations herein is for the purpose of describing particular implementations only and is not intended to be limiting. As used in the description of the various described implementations and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The foregoing description, for purposes of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method for processing pre-authorization request data to reduce turnaround time and improve accuracy, comprising:

receiving historical data including a historical pre-authorization request and clinical information associated with a historical pre-authorization request;

receiving, in real time via an Application Programming Interface (API) gateway, pre-authorization requests wherein the real-time data includes the real-time pre-authorization procedure and a clinical document category;

removing irrelevant data from the real-time pre-authorization requests and historical data to produce clean historical data and clean real-time data;

extracting data features required to train a machine learning model from the clean historical data and clean real-time data, wherein extracting the data features comprises:

creating, using historical data, a multilabel feature mapping between clinical text and a respective clinical category;

training a multilabel classification model by applying multilabel feature mapping between the clinical information and respective clinical categories;

for each respective clinical text of a plurality of clinical text associated with respective procedure codes:

reading respective clinical text associated with a respective procedure code, applying the multilabel classification model to obtain one or more clinical categories associated with the respective procedure code;

creating a multilabel feature mapping between the respective procedure code with the obtained one or more clinical categories; and updating the extracted features to include, for respective procedure codes, a list of respective obtained clinical categories;

training the machine learning model by applying the extracted data features from the clean historical data and clean real-time data;

identifying, by applying the trained machine learning model to a new pre-authorization request, prediction data results comprising specific clinical information that is most likely to be required for a medical procedure;

storing the prediction data results in the database for rapid retrieval;

receiving, via the API gateway, a request for-pre-authorization of the requested medical procedure;

providing, in real-time via the API gateway, the clinical information that is most likely to be required for the requested medical procedure in response to the request for pre-authorization of the medical procedure, thereby reducing back-and-forth communication and expediting the pre-authorization process; and updating a database procedure code with the clinical information that is mostly likely to be required for the medical procedure at intake.

2. The method of claim 1, wherein removing irrelevant data from real-time data and historical data comprises:

identifying whether clinical information in historical data and real-time data contains free-form text;

in response to identifying that clinical information in historical data and real-time data contains free-form text, (i) removing stop words, (ii) extracting all sentences and (iii) removing nonclinical sentences by comparing against a standard nonclinical dictionary to produce clean historical data and clean real-time data for extracting data features;

in response to identifying that clinical information in historical data and real-time data does not contain free-form text, identifying the historical data and real-time data as clean historical data and clean real-time data for extracting data features.

3. The method of claim 1, wherein applying the machine learning model comprises:

executing procedure code in the multi-label classification model to obtain relevant clinical document categories;

obtaining results for clinical information that are required for a medical procedure and/or diagnosis; and updating the database procedure code with the results for clinical information that is required at intake.

\* \* \* \* \*